Figure 1:
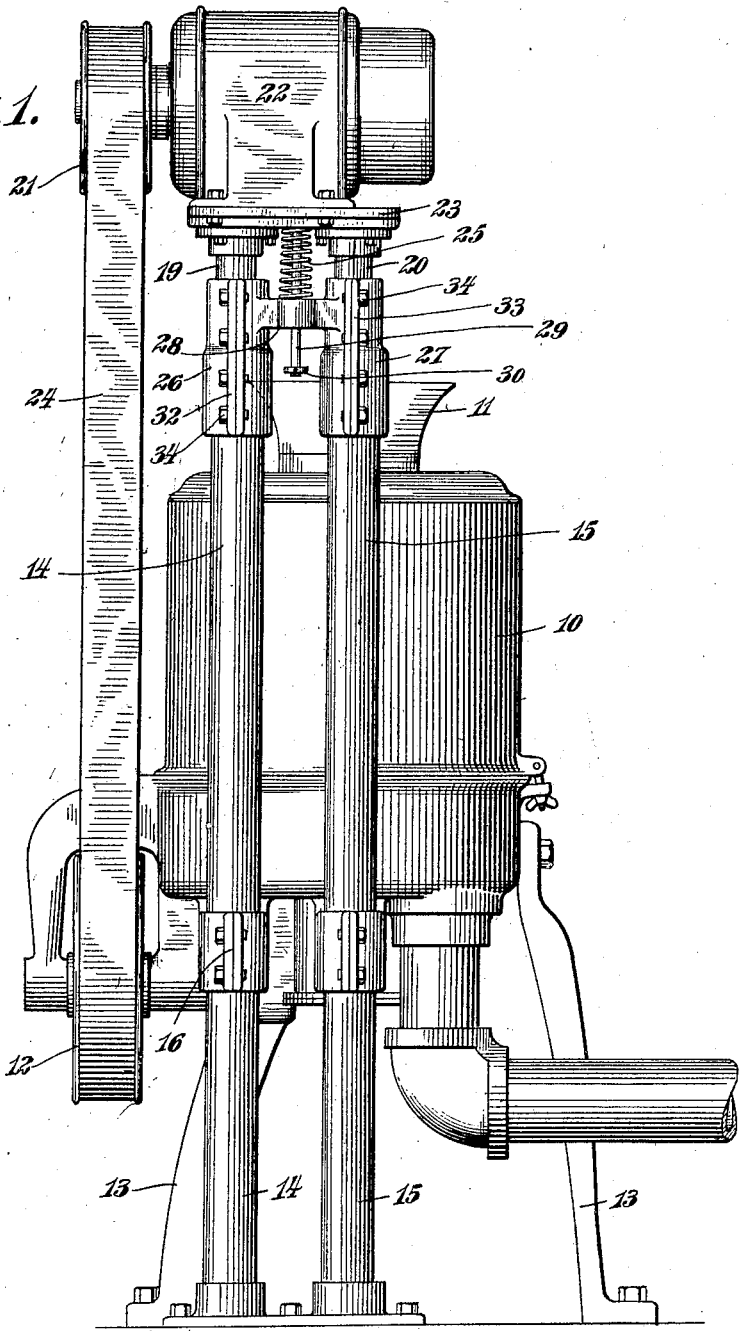

April 1, 1924.

H. ROBINSON

SELF ADJUSTING BELT DRIVE

Filed Dec. 16, 1922   2 Sheets-Sheet 1

1,488,618

Inventor
Henry Robinson
By his Attorney

April 1, 1924.  
H. ROBINSON  
SELF ADJUSTING BELT DRIVE  
Filed Dec. 16, 1922
1,488,618
2 Sheets-Sheet 2
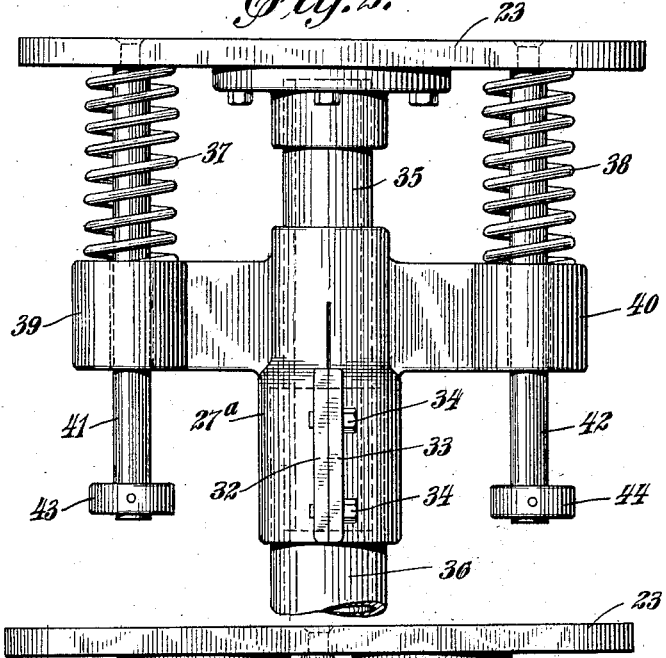
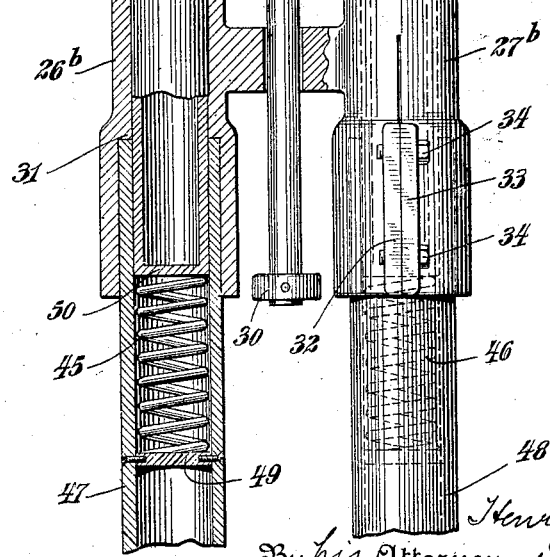
Inventor  
Henry Robinson  
By his Attorney Patented Apr. 1, 1924.

1,488,618

UNITED STATES PATENT OFFICE.

HENRY ROBINSON, OF LINDENHURST, NEW YORK.

SELF-ADJUSTING BELT DRIVE.

Application filed December 16, 1922. Serial No. 607,452.

*To all whom it may concern:*

Be it known that I, HENRY ROBINSON, a citizen of the United States, residing in Lindenhurst, Suffolk county, State of New York, have invented certain new and useful Improvements in Self-Adjusting Belt Drives, of which the following is a specification.

The present invention, in its broadest aspect, relates to an improved mounting for the pulleys of belt and pulley systems of power transmission, capable of use either in such a manner as to keep the driving belt always under spring tension; or, if desired, in a manner to employ springs only from time to time in adjusting pulleys provided normally with a rigid mounting. More particularly, and in the preferred form herein shown, the invention relates to an improved over-head belt-and-pulley driven, self-contained, or automotive machine, such as may be used (among other purposes) for mechanical potato peelers and the like.

The present invention has for its principal object the provision of apparatus of the class above described which combines durability, compactness and simplicity with firmness and solidity of structure insuring against all hurtful vibration.

Certain preferred embodiments of the invention are shown in the accompanying drawings wherein Figure 1 is a view in rear elevation of a potato peeling machine embodying the invention, Figure 2 is a view in elevation on a larger scale of a modified form of pulley mounting, and Figure 3 is a view partly in elevation and partly in section of another modification.

The body of the machine is shown at 10. The potatoes or other vegetables are fed into it through the hopper 11, and, when peeled, are discharged through a door on the opposite side, not shown. The interior active operating mechanism, which forms no part of this invention, is driven in a well known manner by a shaft carrying the pulley 12.

The body 10 is supported by the legs 13, and by the lower and stationary members, 14 and 15, of the extensible columns which serve to support the pulley which cooperates with the pulley 12 in driving the machine. Various devices may be used for the purpose of fastening the members 14 and 15 to the body 10. In the form shown it is preferred to use bolted clamps 16 and 17, as shown in Figure 1.

The members 14 and 15 are hollow, and telescoping with them are the movable column members 19 and 20 on top of which is mounted the movable pulley. In the form shown, this movable pulley 21 is fixed upon the shaft of the electric driving motor 22, carried by the platform 33, supported on the column members 19 and 20. The belt 24 passes over the pulleys 21 and 12 in a well known manner, thereby enabling the motor 22 to drive the interior mechanism of the machine.

In the form shown in Figure 1, a strong spiral spring 25 is placed under the platform 23, being upheld by a firm abutment which renders the spring capable of supporting the platform, motor and pulley 21, and of exerting a driving pressure through said pulley upon the belt. It is preferred to mount this spring in a manner capable of either permitting intermittent or permanent pressure to be applied by means of the spring 25.

For this purpose the extensible columns are supplied with clamping supports for the spring shown at 26 and 27. These clamps are identical in form, and preferably constitute opposite ends of a single casting, being joined by the intermediate abutment or yoke 28. A rod 29 is preferably supplied which depends from the platform 23 within the spring 24 and passes down through the abutment 28. It has a nut at its end which acts as a stop normally preventing complete separation of the various parts of the machine.

The preferred construction of the clamps is shown in Figure 3, although there shown in connection with a modified structure.

Each clamp comprises a lower and larger portion, bored to fit the lower column member, 14 or 15; and an upper and smaller portion bored to fit the upper column member 19 or 20. The bore in the lower part of each clamp terminates in a squared annular shoulder 31, which rests upon the end of the lower column member, thus affording a solid support for the parts above.

On one side (preferably at the rear as shown in Figure 1) the clamps are split vertically, being furnished on opposite sides of each split with flanges 32, 33, and with one or more bolts 34 passing through said flanges.

Where it is intended that the platform 23 shall be rigidly supported during normal operation of the machine, the clamps are slitted from top to bottom (as in Figure 1) and the parts are so proportioned that the tightening of the bolts 34 squeezes the clamps hard down upon both members of each column. This prevents all possibility of relative movement between the telescoping column members, and affords a rigid support.

In this form the adjustment of the pulley to take up stretch in the belt is simply accomplished by loosening the clamps. This permits the spring 25 to act in producing the necessary movement for pulley adjustment, after which the clamps are again tightened preparatory to normal operation.

In Figures 2 and 3 the clamps are shown slitted only part way up, so that the clamps are tightened once for all upon the lower column member or members. This leaves the upper column members free to slip into and out of the lower members, and permits the full support of the platform, motor and pulley 22 to fall upon the spring or springs which thereby exert a continuous spring tension through the pulley 22 upon the belt.

Figure 2 not only exemplifies the use of the clamp whose lower portion only is capable of being tightened upon the supporting column, but it shows also an embodiment of the present invention in a form using one, instead of two, supporting columns. Of course it will be understood, however, that the form of clamp shown in any one figure of the accompanying drawings may be used with the remaining elements of any other figure, without departing from this invention.

In the form shown in Figure 2, the platform 23 (or other pulley support) is carried by the slidable member 35 of a single column upon whose lower fixed member 36 the clamp 27ª rests. As the member 35 is always free to move vertically within the lower member, the weight of the platform 23 and of the parts carried thereby is transmitted to the lower member 36 through two strong spiral springs 37 and 38, resting upon abutments 39 and 40 attached to or forming a part of the clamp 27ª. The rods 41 and 42, depending from the platform 23, and provided with stop nuts 43 and 44 have the functions above described with relation to the parts 29 and 30 in Figure 1.

Another mode of using the tension springs (either continuously or intermittently) is by placing them inside of the telescoping supporting column or columns. This is shown in Figure 3 in a form utilizing two columns and wherein the springs are used continuously. This form is similar to that shown in Figure 1, save that the clamps 26ᵇ and 27ᵇ can only be tightened on the lower column members, and that two springs 45 and 46 are used which are located within the fixed column members 47 and 48.

The supporting springs rest upon disc abutments 49 fixed within the members 47 and 48, and movable discs or washers 50 are preferably interposed between the tops of the springs and the lower ends of the movable column members.

It is obvious that, wherever the spring or springs are used in a manner to exert a permanent spring tension on the pulley, the adjustable clamp or clamps may be dispensed with. In Figure 3, for instance, the supporting springs are carried directly by the lower column members and the clamps serve merely to afford a longer bearing for the slidable upper column members and to cooperate with the rod 29 and nut 30 to prevent accidental complete separation of the parts. They could, therefore, be made an integral part of the lower column members or be permanently attached thereto.

It is not essential to the present invention, broadly considered, that means should be supplied for tightening and releasing the movable member of the extensible column, so long as such a column is used together with a spring for lifting the same together with the movable pulley.

Many changes may be made in the apparatus shown without departing from the scope of this invention, which is not limited to the details herein shown and described.

What is claimed is—

1. A self-contained automotive machine comprising a prime mover and pulley over the body of the machine, a transmission pulley near the bottom of the machine, a belt passing over both pulleys, an extensible two part column having a stationary member fixed to said body and a movable member connected with said prime mover and pulley and a spring adapted to lift said movable column member together with the prime mover and its pulley.

2. A self-contained automotive machine comprising an electric motor and pulley, over the body of the machine, a transmission pulley at the bottom of the machine, a belt passing over the two pulleys, a telescoping two part column having a lower member fixed to one side of the machine and having its movable member attached to the motor, and a spring under the motor resting on the fixed member of the telescoping column.

3. Apparatus as in claim 2 wherein a removable clamp is applied to the fixed column member and wherein a stop is attached to the motor which cooperates with said clamp in preventing accidental complete separation of the parts.

4. Apparatus as in claim 2 wherein a removable clamp is applied to the fixed column member and wherein the spring rests on said clamp.

5. Apparatus as in claim 2 wherein a pair of telescoping columns is provided united by removable clamps.

6. A self-contained automotive machine comprising an electric motor and pulley, a support therefor, a transmission pulley below the same, a belt passing over the two pulleys, two parallel extensible two-part columns fixed to the machine, each having a movable member attached to the motor support, an abutment joining the columns and resilient lifting means supported by the abutment adapted to exert a lifting action on the motor support.

7. Apparatus as in claim 6, wherein the extremities of the abutment are furnished with sleeves surrounding and resting upon the fixed portions of the extensible columns.

In testimony whereof I have hereto set my hand on this 1st day of December, 1922.

HENRY ROBINSON.